INVENTOR.
JOSEPH BECKER
BY Thomas J. P. O'Brien
his ATTORNEY

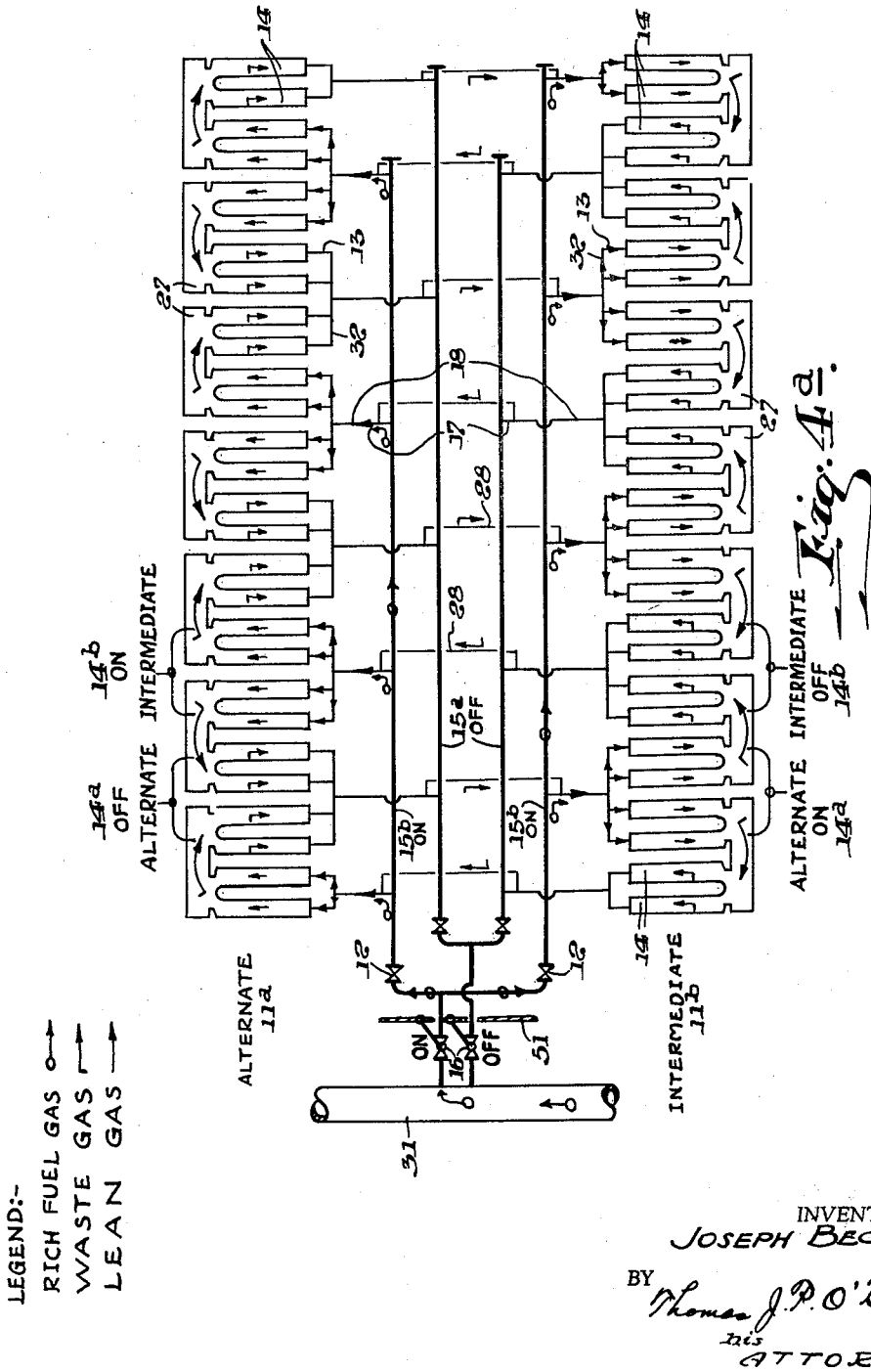

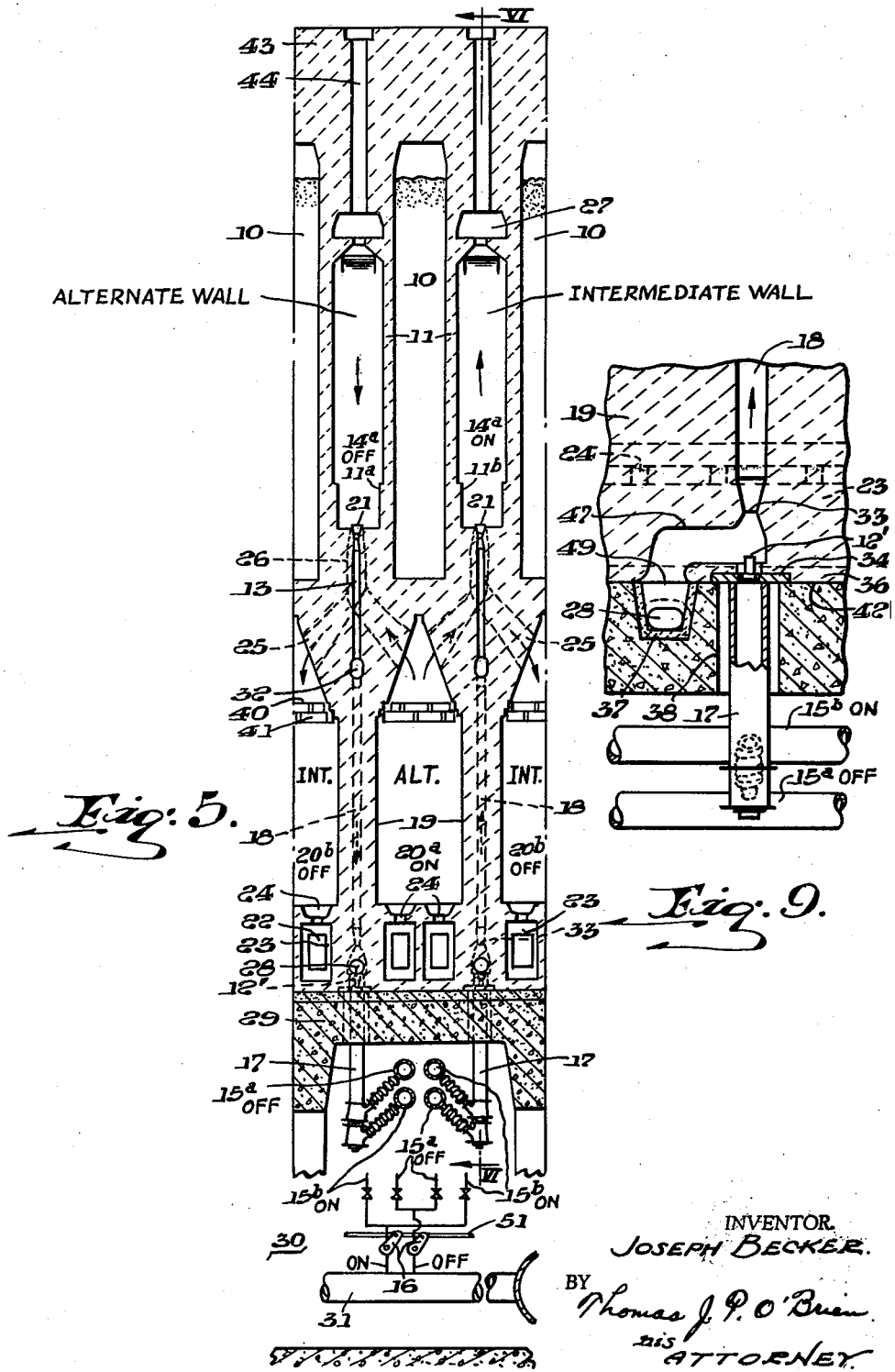

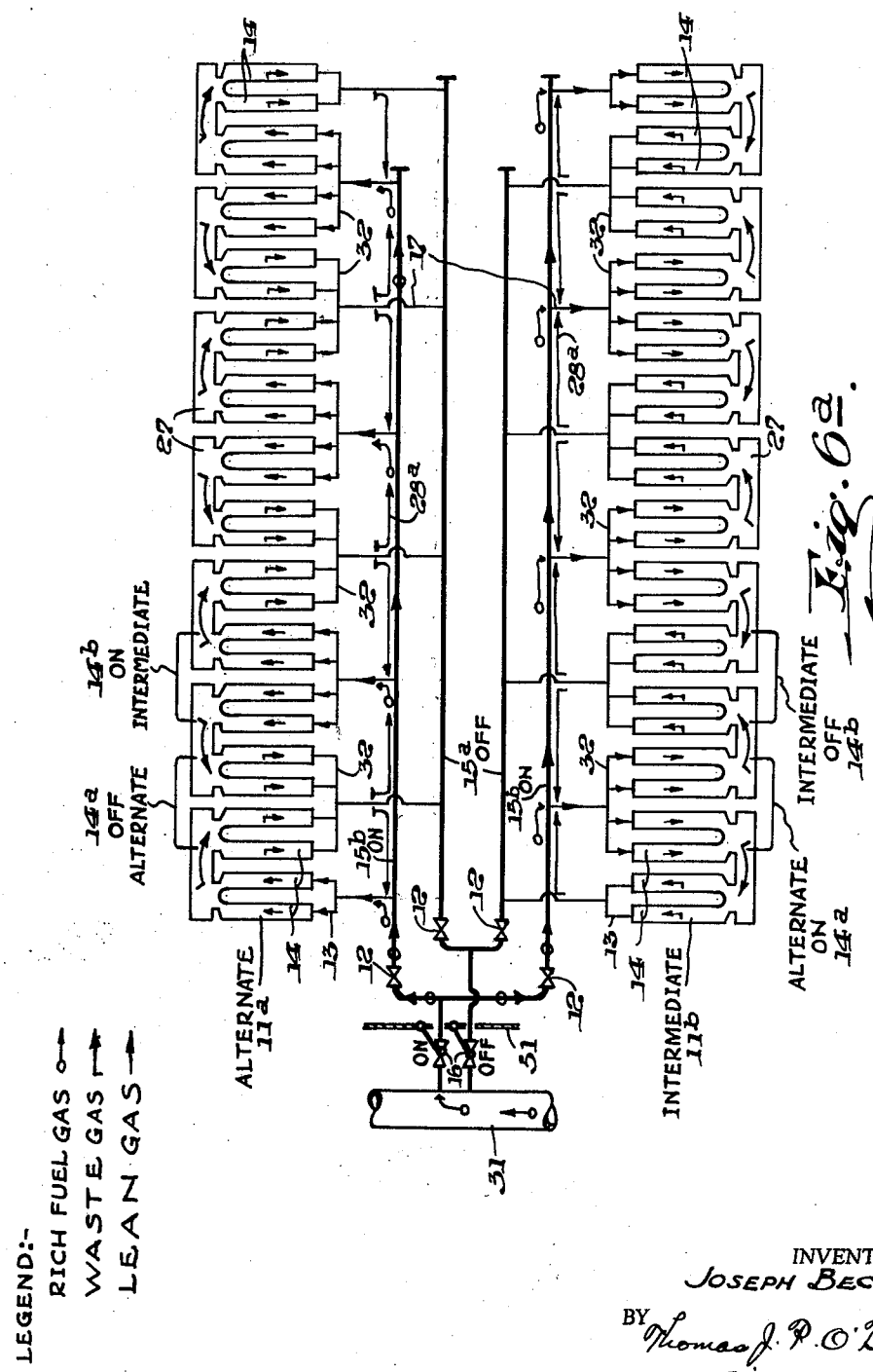

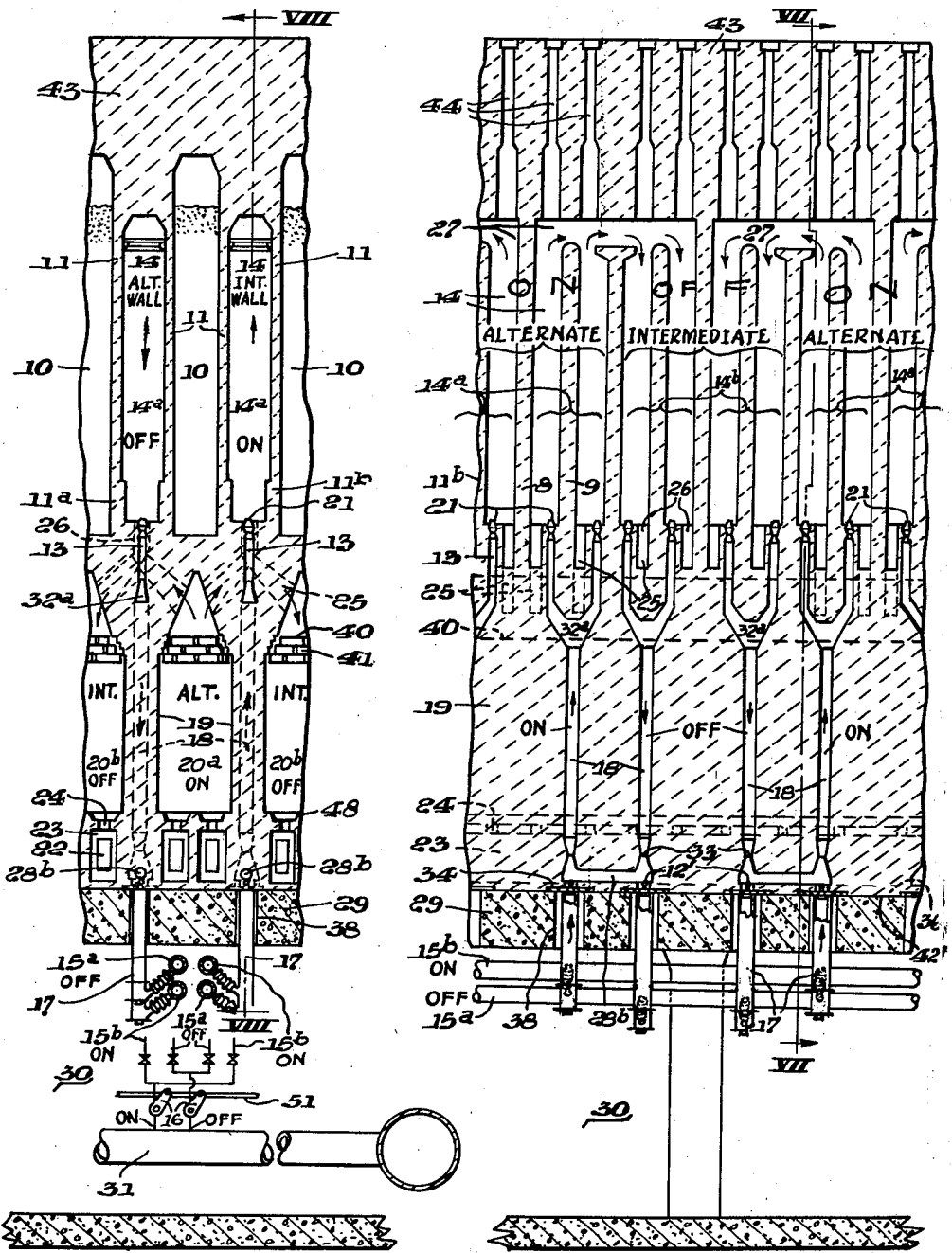

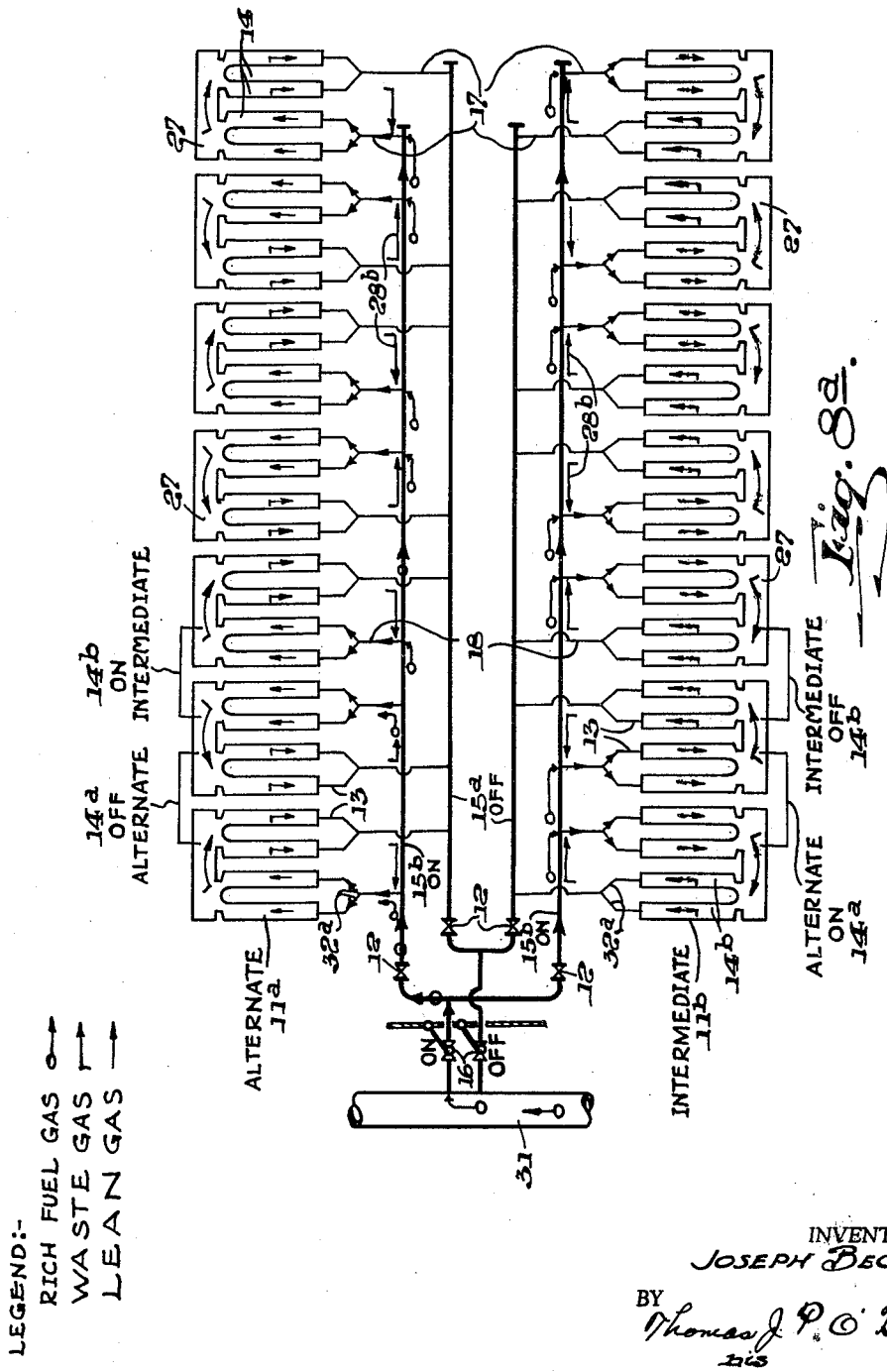

United States Patent Office 3,192,129
Patented June 29, 1965

3,192,129
RECIRCULATION UNDERJET COKING
RETORT OVEN
Joseph Becker, Pittsburgh, Pa., assignor to Koppers Company, Inc., a corporation of Delaware
Filed Oct. 30, 1961, Ser. No. 149,156
3 Claims. (Cl. 202—143)

This invention relates in general to improvements in underjet coking retort oven batteries, and more particularly to those of the underjet waste gas recirculating duct type of J. van Ackeren's patents, 2,507,554 of May 16, 1950, and 2,799,632 of July 17, 1957.

In such heating walls, the coking chambers are tapered to increase in width from the pusher side to the coke discharge side, and so it is necessary to individually regulate the flues of the series along each heating wall to meet the different gas requirements along each wall in correspondence with the differences in thickness of the portions of the coal mass in the coking chambers alongside the different vertical flues. The two end flues at the two opposite horizontal coke and pusher sides of the battery, where greater loss of heat occurs to the atmosphere by radiation, are regulated independently from the intermediate flues. The remaining flues, intermediate these two ends, are commonly regulated, between the ends of the heating walls, in like groups of four flues each. The individual regulation of the fuel gas along each wall for a single battery of many coking chambers, so that such zones may be effectively regulated and independently controlled, is effected from outside the battery by throttling mechanism for the supply of gas for each flue at the base of the battery according to the underjet principle. These batteries are built up of silica masonry with regenerators between oven chamber supporting pillar walls, all of which rest on a concrete mat or foundation pad supported above a basement space by columns resting on the bottom or floor of the basement. The throttling mechanisms feed gas to individual riser conduits which are in the form of brick conduits in the regenerators walls and which are in vertical alignment with the flame flues. The throttling mechanism for each riser conduit and flame flue is in the form of a valve in a metal riser pipe leading individually from a rich gas distribution branch conduit and a rich gas main located in the battery basement. The valves for each flue are thus readily and easily accessible from access passageways in the basement under the battery. The metal riser pipes from the branch conduits in the basement which metal pipes must extend through the concrete of the oven foundation mat and the brick riser conduits in the regenerator walls, necessarily must be in vertical alignment with their individual flame flues. Consequently, the space available between the riser conduits to the flues is thus limited to the horizontal area of each flame flue.

This system of coke oven gas flow is costly and complex in construction, operation and maintenance, since its construction requires the use of 73% of the more costly special brick shapes for the rich gas conduits in relation to the use of 27% of the less costly straight bricks that cost only one-third the cost of the special shapes throughout the entire length and height of the regenerator division walls, as well as costly metal pipes with valves for control of gas from each of the rich gas branch conduits, for each heating flue in each heating wall, and special spaces in the concrete mat for the relative movement between the metal pipes and the concrete mat or pad for each and all of the flame flues in a heating wall, as well as costly individual interconnecting means between each metal pipe and the silica brickwork of the regenerator division walls, to hold each pipe in axial alignment with its brick gas conduit in the regenerator division wall, as the silica walls expand differentially relative to the concrete mat from the center of the battery towards both coke and pusher sides thereof, when the oven is heated up for operation from its cold condition. In operation, this system requires individual adjustment of the underjet valves for each of the flame flues to alter the volumes of decarbonizing air, and the volumes of fuel gas fed to each flue and to adjust the gas pressure to each flue, so that all the flues of any section of all of the heating walls are provided with gases at substantially uniform pressure and the pressure differential between the interior of the coking chamber and the heating flues is greatly reduced. This cost and complexity in construction, operation and maintenance is accentuated with the incorporation of waste gas recirculation ducts of the aforesaid J. van Ackeren type in conjunction with the individual rich gas riser conduits or passages of said underjet type ovens in a manner to dilute the righ gas for each flame flue with the desired amount of waste gas which elongates its flame to the height desired in each of the heating flues by the individual jet action of the individual jets of rich gas as they leave the metal pipes that lead off gas from the branch conduits connected to the principal rich gas main in the underjet basement space.

Such waste gas recirculation ducts must be located in the region of the bottom of the coke oven battery in the area of the bottom of the regenerators and the concrete mat on which the regenerators rest, which area is a location where the gas leaving the branch conduits still has sufficient pressure to produce by its jet action, a syphonic flow of waste gas from a flame flue operable for off-flow of waste gas downwardly through its rich gas riser conduit, then idle to gas flow, into a rich gas riser conduit, then operable for feed of rich gas to a flame flue that is then operable for concurrent flame heating by combustion of rich gas and preheated air from the regenerators. It is less costly to have the recirculation ducts located in the concrete mat through which the metal pipes also extend from the rich gas branch conduits in the basement of the battery. In general, there is insufficient space in the mat to accommodate both the recirculation ducts and the metal riser pipes for all flame flues in each heating wall of the battery, since these parts must be located in the same vertical plane as the respective flame flues that they serve. The metal riser pipes each require a free space in the mat sufficient for the metal pipes to move relative to the mat in unison with the expansion of the silica of the brick conduits in the regenerator division walls, to maintain the pipes in axial alignment with the brick conduits for the purpose of providing a jet of gas to syphon the waste gas. There generally is insufficient space available for both this free space for these pipes and for the space required for the waste gas recirculation ducts. Location of the waste gas recirculation ducts in the silica brickwork at the base of the regenerators eliminates this difficulty, but such location requires more costly brick shapes for this purpose. A relocation of the individual rich gas riser conduits in the regenerator walls relative to the vertical plane of each of the flame flues, as disclosed in Patent No. 3,047,474 to L. G. Tucker, Jr., serves the purpose of locating both the waste gas recirculating duct and metal riser pipes in the concrete mat in a less costly way, but still requires the costly construction and operation as pertains with the provision of separate rich gas riser conduits for each flue in each heating wall from the region of the tops of the regenerators down to the rich gas branch conduit in the battery basement.

The present invention provides for the group distribution of recirculated waste gas diluted rich fuel gas into the flues of each heating wall. The groups are separately regulable according to the different heating requirements of the different sections of the wall as governed by the difference in thickness of the tapered coal charges in the adjacent coking chambers. The recirculated waste gas diluted rich fuel gas is, however, still delivered in individual streams to each of the flame flues of a group. Yet the number of special shapes for the silica brick riser conduits in the regenerator walls is reduced to 7 to 14% from the 73% as has heretofore been required. The number of valves and metal riser pipes for connecting the flues of a group to rich gas branch conduits and their principal gas main in the basement space under the coke oven battery is greatly reduced, as well as the number of waste gas recirculation ducts required in the region of the base of the regenerators and concrete mat.

Accordingly, the present invention provides for the purpose, separate horizontal distribution channels for the respective groups of flame flues alongside the different regions of the coking chambers, said channels being located below the bottoms of the flame flues in the brickwork at the tops of the regenerator division walls. Individual riser ducts extend from the base of each of the flame flues of a group down to their horizontal channel. Each horizontal channel is provided with a single riser brick conduit which extends down through the regenerator walls to the top of the concrete mat or pad on which the regenerators rest. Waste gas recirculating ducts are located in the area of the bottoms of the regenerators and the concrete mat where the gas pressure is still high enough to induce a circulation of waste gas through the waste gas ducts by the jet action of the entering rich gas. Each of the waste gas recirculation ducts communicably connects one of the riser brick conduits for a flue group with a riser brick conduit for another flue group. A metal riser pipe extends through a passageway in the concrete mat in axial alignment with each one of the riser brick conduits and is interconnected with the silica brickwork for axially aligned movement in unison with their brick riser conduits, as the brickwork expands. The metal riser pipes each are provided with interchangeable or adjustable nozzles for discharge of rich gas in calibrated amounts into the brick conduits in the form of a jet where the waste gas ducts connect with the brick riser conduits, so as to induce the flow of waste gas into mixture with the rich gas leaving the nozzles. The metal riser pipes for the brick conduits of two flue groups that are connected by a waste gas recirculation duct are fed in alternation with each other with rich gas, as by separate branch conduits in the basement of the battery. The branch conduits are each connected with several of the metal riser pipes for a plurality of flue groups. These branch conduits or headers are in general connected to a principal gas main that is likewise located in the basement space under the underjet battery mat. With this arrangement, a single metal riser pipe, a single adjustable valve, recirculation duct and rich gas riser brick conduit, suffices to regulate and control the volume of flow to all of the flame flues of a group, rather than a multiplicity of these parts for the respective flues of a group. Nevertheless, the gas is delivered individually into each flue in the proportion required for the flues. In a battery of coke ovens, this system of heating greatly reduces the overall cost and complexity in construction, operation and maintenance of a battery, since such batteries are generally built up of 50 or more coking chambers in alternation with 51 or more heating walls having as much as thirty-two flame flues in each heating wall.

The flues are generally operable in groups of four flues each, and hence, the number of riser conduits, riser pipes, valves or fuel gas jet orifice plates is reduced from 1600 to about 400. This reduction in the number of risers, fuel gas nozzle jets and waste gas recirculation ducts, greatly simplifies the cost and complexity of construction, operation and maintenance of such waste gas recirculated underjet coke oven batteries.

One of the principal advantages of this arrangement is the great reduction of the number of silica shapes required in the regenerator walls, since instead of having 73% special shapes at a cost of say $163.00 a ton and 27 straights in each oven chamber pillar wall at a cost of say $55.00 per ton, there are required only 7% of the three times as costly special shapes and 93% of the less costly straight shapes per pillar wall. The only special conduit shapes required are for the area around a single riser conduit for a group of flame flues, such as for two, four, etc., flues of group. The lean gas formed by the mixture of rich gas and waste gas from each riser conduit is then distributed by a horizontal channel to the group of vertical flues connected to the brick riser conduit. Permanent ports at the base of each vertical flame flue or, if desired, individually removable nozzles can be installed which are removable upward through the flues from the top of the battery by means of access passages in the roof of the oven battery. It is only necessary to accomplish one uniform setting of these nozzles to attain the required distribution to each flue of the proportion of the lean gas mixture of rich fuel gas and waste gas desired to be delivered from the horizontal channel, since once this proportion is established, any latter change in the volume of final gas that may be desired to be delivered to each group of flues, in order to effect an adjustment of the crosswall temperature, can be simply and more easily accomplished by merely changing the underjet nozzles or other underjet valve means such as the orifice plates for the single metal riser pipes for the single brick riser conduit for the group of flues.

The invention has for further objects, such other improvements and such other operative advantages or results as may be found to obtain in the structure hereinafter described or claimed.

In general, the best mode of carrying out the invention is to utilize the simplified system of the invention in conjunction with underjet coking retort oven batteries of the crossover flue interconnected combustion flue type, as illustrated in J. van Ackeren's patents 2,507,554 and 2,799,632. However, the invention is also of equal utility with other types of flow interconnected heating flue systems of the alternate "on" and "off" type, such as in the hairpin flue type, and more particularly, those of the double hairpin flue type. Hence, the invention is not confined or limited in all its aspects to use with heating flue systems of the aforesaid types which are hereinafter described as illustrative examples.

FIG. 2a is a diagrammatic view of the fuel gas flow in FIGS. 1 and 2;

FIG. 4a is a diagrammatic view of the fuel gas flow in FIGS. 3 and 4;

FIG. 5 is a view similar to FIGS. 1 and 3 illustrating the invention as applied to a double hairpin flue type underjet oven but with the recirculation ducts located wholly within the silica brickwork at the bottom of the regenerator division walls, the section being taken longitudinally of the battery on the line V—V of FIG. 6, and showing a single recirculation duct for the entire heating wall;

FIG. 6a is a diagrammatic view of the fuel gas flow in FIGS. 5 and 6;

FIG. 7 is a vertical sectional view similar to FIG. 5 but illustrating a series of independent recirculation ducts for each of the entire heating walls, the section being on line VII—VII of FIG. 8;

FIG. 8 is a vertical sectional view taken crosswise of the battery through one heating wall, the section being on the line VIII—VIII of FIG. 7;

FIG. 8a is a diagrammatic view of the fuel gas flow in FIGS. 7 and 8;

FIG. 9 is an enlarged view of a portion of the bottoms of FIGS. 2, 4, 6, and 8.

The same reference characters are used to indicate the same parts in each of the different views.

Figure 1:
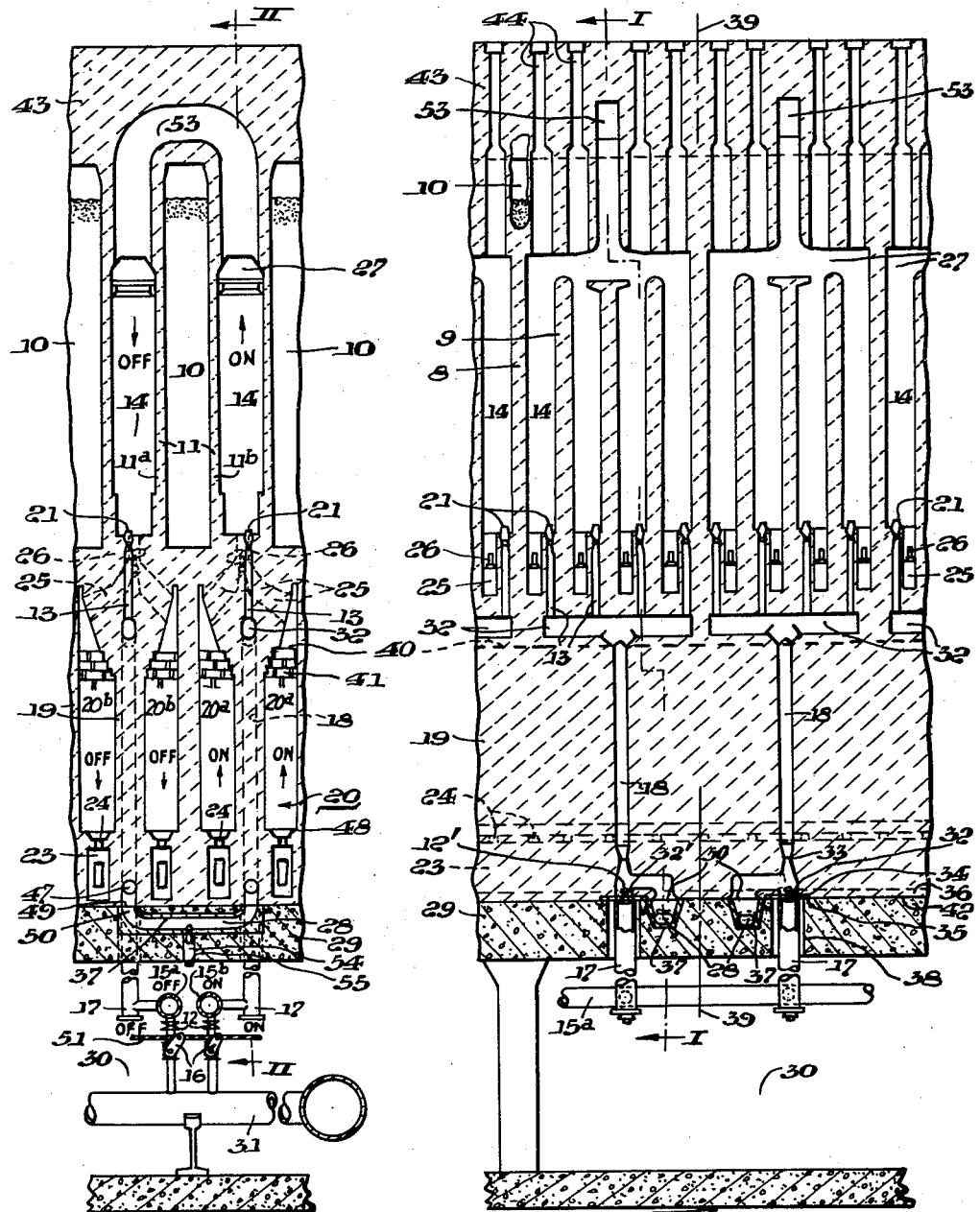
FIGURE 1 is a vertical section taken longitudinally of an underjet crossover flue type coke oven battery built according to my present invention, the section being taken on the line I—I of FIG. 2, and illustrating the recirculation flue in the concrete oven supporting mat or pad.

Referring to the drawings, the coking chamber 10 is one of any preferred number of horizontally tapered horizontal oven chambers lying side-by-side and alternately disposed between the heating walls 11 to form a battery of the same. The opposite ends of each oven are closed during the coking period by removable doors (not shown) and the coal to be carbonized is charged into the oven through charging-holes (not shown) provided in the top of the battery for this purpose. The heating walls 11 are maintained at the desired temperature for effecting the distillation of the coal charges by burning, within the flame flues 14, rich gas flowed through reversing valve means 16 through regulating valves 12 to the distributing branch-headers or conduits 15a, 15b metal riser pipes 17, and rich gas riser silica brick conduits 18 positioned in the silica brick regenerator division walls 19, which walls 19 separate, from each other, the side-by-side cross regenerators 20 that extend transversely of the battery in its entire length. The rich underfiring gas rising under slight pressure through the metal riser conduits 18 flows into the upburning flame flues 14 through silica brick riser ducts 13 having the removable port-determining nozzles 21. At the lower part of the flame flues, the rich gas is mixed with the regeneratively preheated combustion air drawn through the regenerator sole flue air ports 22 by the draft induced by the stack (not shown) with which the underfiring system of the battery communicates in the well-known manner. Said combustion air, following its introduction into the regenerator sole-flues 23, is distributed through the silica brick straights 41 in the regenerators 20 by means of the sole-flue ducts 24. In the regenerators, the combustion air is preheated and distributed to the individual flame flues through the conduits 25 and the nozzle ports 26 situated at their upper ends. The regenerators and flues are operatively disposed into two sets for alternate "off" and "on" operation. The preheated gas and air burn in the flues 14 and evolve heat which is conducted through the chamber walls 11 to the horizontally tapered coal charge. The products of the combustion reaction from one set of flues in "on" operation rise through the flame flues and assemble in the horizontal bus channels 27 and flow into the corresponding flame flues of the other set then in "off" operation. At preferred intervals, the flow of gases in the battery underfiring system is reversed and the upburning flame flues become the downflowing ones upon reversal of the regenerative system. This reversal of flow is effected by proper adjustments on the reversing valves 16 and the air-flow boxes (not shown) controlling the volumes of air entering the regenerator sole channels 23.

Figure 2:
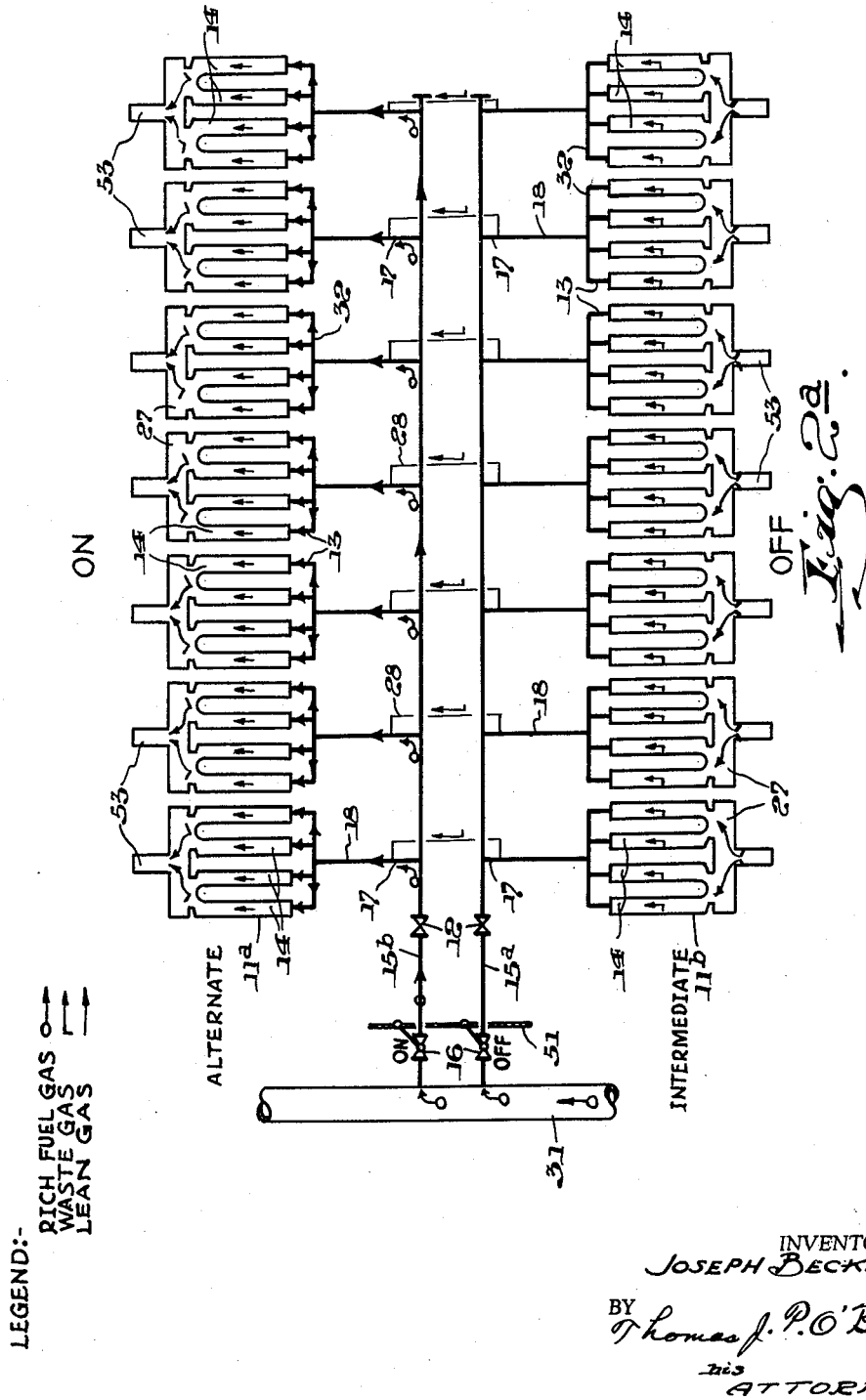
FIG. 2 is a vertical section taken crosswise of the battery through one of the heating walls, the section being taken on the line II—II of FIG. 1.

As will be noted, the heating flues 14 comprising each heating wall are disposed to operate simultaneously either as upflowing or downflowing flame flues, in groups or sets of four, for gas-flow purposes, with the exception of the two flues at both ends of a coking chamber which are disposed in pairs, in all figures of the drawings other than FIGS. 1, 2, and 2a. In this manner the plurality of vertically disposed heating flues along the wall of an oven is divided into a series of individually operable and regulable heating flue-groups, adjacent the oven charge, which are individually adjustable to permit establishing zones or belts of heating in which thermal units may be liberated in correspondence with the different heat requirements of the divers quantities of coal found at various points along the oven chambers from the coke-side to the pusher-side, and in which the different heat losses by radiation from said groups, in consequence of their different remotenesses from points of average radiation losses, may be compensated for.

It will be also noted that the tops of most of the flues of each group of four flues provide flue ports, for porting into the horizontal bus channel, which are of sufficient cross-sectional area in relation to the flue cross-sectional area to offer no significant obstacle to gas flow, and to establish a substantially equal flow-path for all the gases of said flue-group in their transit through the vertical flues and horizontal flow duct.

Heretofore, the common practice in the art of underjet ovens has been to introduce the underfiring gas through individual riser conduits 18, each individual to one flame flue in a heating wall from distributing headers and a rich gas supply main in a basement space 30 underneath the concrete mat 29 for the battery. This has required individual valve means 12' for each flue connected therewith so that the differences in static pressure in the single distributor-header 15a or 15b beneath each flue, may be compensated for, to the end of obtaining preferred temperatures in the various flues along the wall.

In accordance with the instant improvement in conformity with said common practice in this art, each two underjet riser conduits 18 that are associated with corresponding on and off heating flues 14 are each communicably connected adjacent their lower ends by means of recirculating duct 28 located in either the concrete mat 29 or in the regenerator walls 19 alongside the sole flues 23, whereby a circulation of waste gases is established between the lower parts of the heating flues 14 connected thereby. When the recirculating ducts 28 are entirely surrounded by the concrete material of the mat 29, as in FIGS. 1 to 4a, they are made of high duty clay liner sections.

Each metal riser pipe 17 has its outlet end removably inserted into the lower part of its underjet riser conduit 18, along which it extends to a point substantially at the level of the bottom of the silica brick in the regenerator walls 19.

The rich fuel gas is delivered into the individual underjet conduits 18 by means of the gas flow nozzles 12', and the position of their discharge orifices 32' is adjustable in respect of the narrowest central portion of the Venturi member 33. Nozzles 12' being replaceable, the amount of fuel gas delivered to the heating flue above is optionally variable either by substituting for an existing nozzle 12' a like nozzle 12' having an outlet orifice 32' of different effective area or by altering the gaseous pressure maintained in the associated branch conduit 15a, 15b.

The rich fuel gas injected into the underjet conduits 18 in the form of a jet exerts an ejector effect on waste gases contained in the recirculating ducts 28 and causes the waste gas from an off-flue 14 to flow upwardly with the jetted rich fuel gas and to admix therewith as a diluent. When an on conduit 18 is delivering rich fuel gas to the on flue thereabove, its corresponding off heating flue with which said on flue is communicably connected by means of recirculating duct 28, is filled with waste gaseous combustion products flowing downwardly from flues 14 to outflow regenerators. The on underjet conduit 18 and its associated recirculating induction duct 28 are thus filled with gaseous combustion products derived from the top of an on heating flue 14 through the off heating flue 14 and its off conduit 18. Inasmuch as these combustion products are relatively inert, their mixing with the rich fuel gas as they rise through the on conduit 18 has the effect of introducing into the lower part of heating flues 14 a lean fuel gas mixture of lower calorific value and slower combustion characteristics than would otherwise obtain with the rich fuel gas alone. This has the beneficial effect of making it possible to maintain a reduced temperature gradient between the tops and bottoms of the heating flues and so promotes uniformity of heat distribution throughout the adjacent coal charge. As is obvious from the drawings, reversal of flow of gases through the on and off flues in no way alters the results obtained.

Access may be had into each recirculating duct 28 from the battery basement 30 through a conduit 54 for cleaning or regulation by way of cap 55 that is removably mounted on the lower end of the walls of said conduit 54.

As in the aforesaid Patent 2,507,554, the gas lines 15ª, 15ᵇ, 17 and nozzles 12' are interlocked with the silica brickwork structure of walls 19, which is differentially expansible on top of the concrete mat 29, by means of metal blocks 34 in cement in recesses 35 in the base 36 of the silica walls 19, to move the nozzle 12' in correspondence with the movement of the silica brickwork of the regenerator walls 19 during its movement in expansion and contraction, relative to the concrete mat 29, and to the clay of the sole channels 23, to thereby hold the nozzle 12' and line 17 in coaxial alignment with each other and with the venturi throat 33 and the axis of the upper portions of the rich gas riser underjet conduits 18 in the silica walls 19, as shown in FIGS. 2, 4, 6, 8 and 9.

The recirculating ducts 28 are composed of fire clay pipe sections 37 when encased in the concrete of the mat 29 in end-to-end relation, and the mat 29 is provided with through passages 38 to accommodate the lateral movement of the metal gas riser pipes 17 and their nozzles 12' when they move in unison with the silica brickwork of walls 19.

When heated up, the concrete of the mat 29 expands cumulatively from the longitudinal vertical central plane 39 of the battery towards its two opposite sides to a lesser extent than the silica masonry of the walls 19 at their juncture with the top 42 of the concrete mat 29. At each opposite coke and pusher side of the battery, the concrete mat 29 may move out one and one-quarter inches whereas the silica brickwork in walls 19 may move out three inches. The brickwork of walls 19 therefore must be predesigned to be built in the cold so as to have the interconnecting riser conduits 18 offset from those metal parts 17 thereof, in the mat 29, in different degrees from the center 39 outwards toward the opposite sides of the battery to ensure their proper register when the battery is fully heated up. The movement of the riser pipes 17 is such that heretofore there has been left insufficient space in the mat 29 to contain both the recirculating ducts 28 in the mat 29 when such ducts 18 are individually located in the battery structure in correspondence with each flame flue and with the recirculating ducts 28 in the vertical plane of the intermediate partition walls 8 of the vertical combustion flues 14 alongside the coking chambers 10, since with the rich gas risers 17 in vertical planes on opposite sides of such waste gas ducts 28, the concrete area in the mat 29 between the through passages 38 is insufficient in width to accommodate both individually movable pipes 17 and the recirculating duct 28 in an immovable manner in the mat.

In accordance with the improvement of the aforesaid L. G. Tucker, Jr., patent, the heating flue gas flow system was revised to connect the rich gas riser underjet conduits 18 that are in planes on opposite sides of the alternate walls 8 with the same recirculation duct 28, rather than connecting the underjet conduits 18 on opposite sides of the intermediate partition walls 9 with the same recirculation duct 28. In this manner a wider area was made available to incorporate the recirculating duct 28 under the alternate partition walls 8 with the rich gas underjet nozzles 12' retained in their positions in vertical planes on opposite sides of the intermediate partition walls 9 and closer to the intermediate partition walls 9 than to the alternate walls 8.

Each pair of gas riser underjet conduits 18 on opposite sides of an alternate partition wall 8 was connected to the recirculating duct 28 in the vertical plane of the alternate partition 8 and was connected therewith by branch conduits 47 extending towards said vertical plane at a level below the tops 48 of the sole channels 23 and communicating in common with a downwardly opening inlet 49 flush with the base 36 of the silica regenerator wall 19.

The recirculating ducts 28 terminated at each end in upwardly opening flared outlets 50 to register with the downwardly opening inlets 49 for their corresponding pairs of gas riser underjets 18 in each of the two regenerator walls that the recirculating ducts individually interconnect.

In accordance with the present invention, a significant reduction in the number of valve nozzles 12', plates 35, metal pipes 17, spaces 38, waste gas recirculation ducts 28, and brick riser conduits 18 between the concrete mat and the tops of the regenerators, is attained, while still providing for individual flow to each flame flue 14 in each heating wall 11, by providing individual horizontal distributing channels 32 in each heating wall, below the bottoms of the flame flues 14 but above the tops 40 of the regenerator brick 41 in the regenerator area for the regenerators 20. Each distributing channel 32 is connected solely to a single group of the on and off flow flues 14 operable for simultaneous flow in on or off operation.

Each individual channel 32 for each flue group is provided solely with a single brick riser conduit 18 leading to the corresponding branch conduit 15 (15ª, 15ᵇ) in the basement 30. The brick shapes for these regenerator walls are straight shapes and special shapes for the riser conduits 18, of which the special shapes cost per ton three times the cost per ton of the straight shapes in the ratio of $163.00 per ton to about $55.00 per ton. Thus, for each flue group, there is also required only a single one of the metal pipes 17 and a single space 38 therefor in the mat 29, as well as a single one of the plates 34, nozzles 12', and a single recirculation duct assembly comprising the component parts 33, 47, 49, 50 and 28. Each flue 14, however, is still individually served with lean gas in the form of waste gas diluted rich fuel gas by means of short upper individual riser ducts 13, each with individual removable nozzles 21 interchangeable through the oven battery roof 43 by means of flue access passages 44.

In operation, it is only necessary to accomplish a uniform split or distribution of the fuel gas-waste gas mixture from the channels 32 by the nozzles 21, since once this distribution is determined and fixed by setting the correct nozzles 21 in the short ducts 13, any further change in the volume of fuel gas desired to be supplied to each group of flues 14, for adjustment of the crosswall temperatures, can later be attained by changing the nozzles 12', or equivalent valve, for the metal pipes 17 of the group, which valve or nozzle 12' is readily and more easily accessible at the base of the battery through riser pipes 17 from the basement space 30.

In the general operation of the battery, fuel gas from the main 31 is delivered through the valves 16 to first one and then the other of the two sets of on and off branch conduits 15ª, 15ᵇ. This is done by operation of the valve reversing mechanism generally indicated by the numeral 51. This mechanism also operates the waste heat valves and the air inlet valves (not shown) outside the passageways 22 for the on and off sole flues 23. This reversing mechanism 51 operates every 25 to 30 minutes, to close the waste heat valve and open the air valve for the on sole flues 23 and close the air valve and open the waste heat valves for the off sole flues 23. It also closes the valves 16 for the off rich gas branch conduits 15$^a$ and opens the valves 16 for the on rich gas branch conduits 15$^b$.

The air to be preheated in the regenerators 20 then flows through the on openings 22, sole flues 23, ducts 24 to the regenerator brick filling 41 in the on regenerators. Simultaneously rich fuel gas flows from the gas main 31 through the on valves 16, branch conduits 15$^a$, 15$^b$ to the on set of metal riser pipes 17. The gags is discharged by the on calibrated orifices 32′ of nozzles 12′ axially through the venturi throat 33. This induces a syphonic flow of waste gas from the bottoms of the off set of flame flues 14, down through the off set of nozzles 21 riser ducts 13 of each group of flues 14 to their distributing channel 32, from which the waste gas flows down through the off brick riser conduits 18 to the recirculation duct 28 which delivers the waste gas to the venturi 33 of the on riser conduit 18 wherein the rich gas has been injected by the on nozzles 12′ or orifice plates 32′. The rich fuel gas and waste gas mix in the venturi 33 and thus dilutes the rich gas to a weaker or lean fuel gas that produces an elongated flame comparable to that made with producer gas or blast furnace gas. The now lean gas mixture for a group of flues 14 flows from conduit 18 then into the channels 32 which distributes the gas to the individual short riser ducts 13, which delivers the gas in the required proportionate amount to each flame flue 14 of a group in accordance with the settings of the nozzles 21 for the respective flues of a group connected to the respective channels 32. Concurrently with the foregoing, air introduced through the on sole channels 23, rises through a series of regenerator ports 24 to diffuse through the regenerative brick mass 41. As this air rises through the regenerative mass 41, it absorbs heat stored therein from the waste gases of combustion in the previous off phase of operation in the regenerative cycle. The air so preheated issues through the regenerator ducts 25 into the base of the on flame flues 14, wherein it burns with the diluted rich fuel gas from the nozzles 21.

The combustion gases pass from the on flues 14 through the bus channels 27 into the tops of the other set of flues 14 that are then operable for off operation. The waste gas imparts its residual coking heat to the walls 11 as the waste gases pass down the off flues 14. The gases leave the bottoms of the off flues through the regenerator ducts 25 to enter off regenerators 20. The gases give up heat to the regenerative mass 41 as it diffuses down through the mass, and the waste gases then leave the off regenerators through the ports 24 and off sole channels 23 through the opening 22. From this opening, the waste gas passes through the (not shown) off waste heat valves and waste heat tunnel, to flow up a smoke stack out into the atmosphere.

In the embodiment illustrated in FIGS. 1, 2 and 2$a$, there is shown the invention as applied to coke oven batteries in which waste gas recirculation is attained by means of recirculation ducts 28 located in the concrete pad 29 and connecting the riser conduits 18 in one heating wall with the corresponding riser conduits 18 in an adjacent heating wall. As shown, the ducts 28 extend longitudinally of the battery underneath the sole flues 23 beneath the regenerators 20 that intervene between the regenerator division pillar walls 19 containing the riser conduits 18 that are interconnected by the waste gas recirculation ducts 28. In this case, each interconnected riser conduit 18 serves four flues in its heating wall through the interconnecting individual distributing channel 32 and the riser ducts 13 to the vertical flues 14 of the same group. With this arrangement, all the groups of flues in one wall burn upward while all the corresponding groups of flues in the adjacent heating wall burn downward. The flues in one wall are communicably connected at their tops with the tops of the flues in the adjacent heating wall by means of crossover flues 53 which communicably interconnect the bus flue 27 in each of the heating walls that have their riser conduits 18 interconnected by the waste gas recirculation ducts 28.

Figures 3, 4:
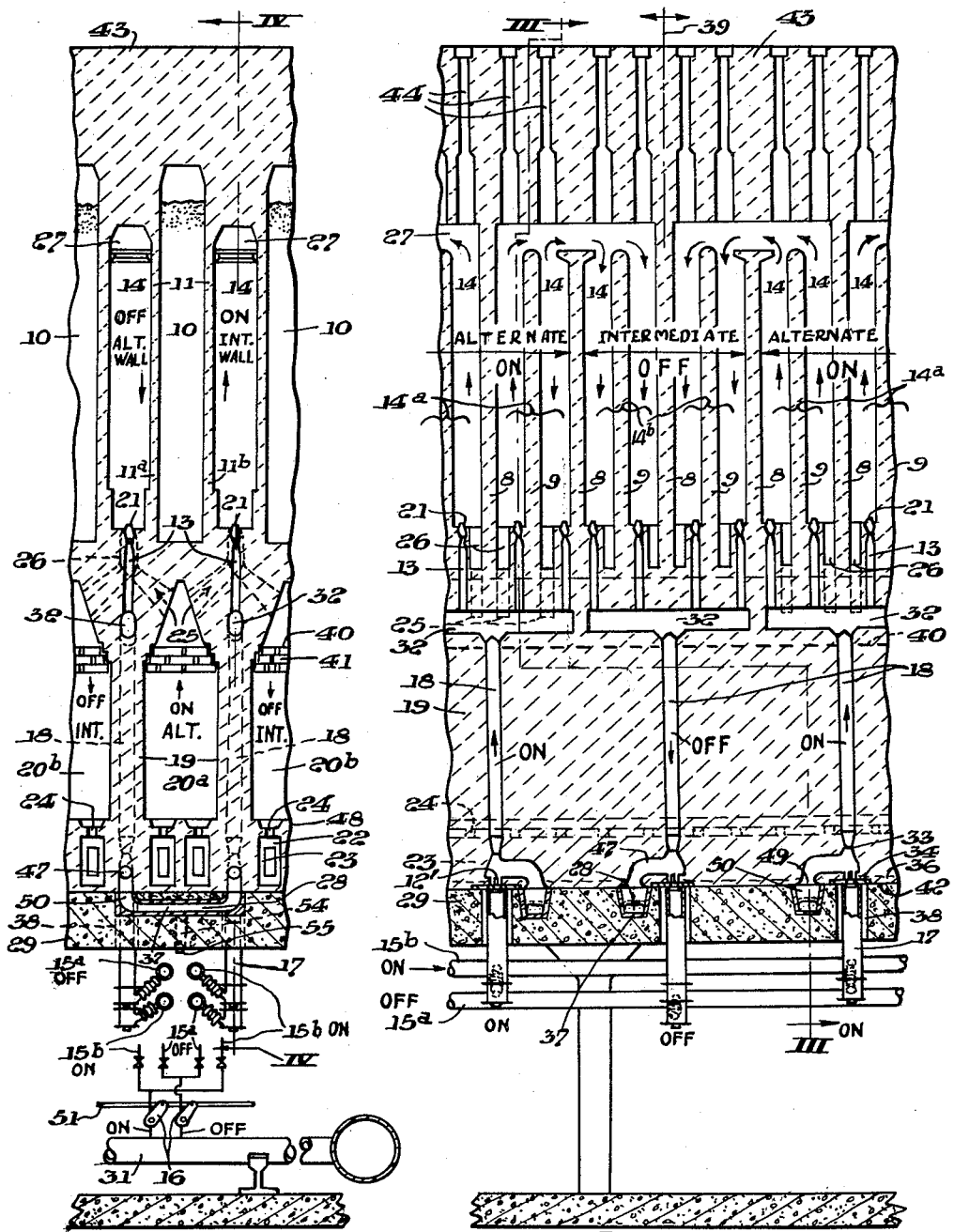
FIG. 3 is a vertical sectional view similar to FIG. 1 illustrating the invention in an underjet double hairpin flue type battery, the section being taken longitudinally of the battery on the line III—III of FIG. 4, and likewise showing the recirculation duct in the concrete oven supporting pad or mat.
FIG. 4 is a vertical sectional view taken crosswise of the battery through one heating wall, the section being on the line IV—IV of FIG. 3.

In the embodiment illustrated in FIGS. 3, 4 and 4$a$, the invention is shown as applied to ovens in which the heating walls are each in groups of four flues each and end groups of two flues each constituted of heating flues of the double hairpin flue type and in which waste gas recirculation is also attained by means of recirculation ducts 28 located in the concrete mat or pad 29 and connecting the riser conduits 18 in one heating wall with the corresponding riser conduits 18 in the adjacent heating wall. As shown, the ducts 28 extend longitudinally of the battery underneath the sole flues 23 beneath the regenerators 20 that intervene beneath between the regenerator division pillar walls 19 containing the riser conduits 18 that are interconnected by the waste gas recirculation ducts 28. In this case, each interconnected riser conduit 18 except the end wall ducts serves four flues in its heating wall through the interconnecting individual distributing channel 32 and the riser ducts 13 to the vertical flues of the same group. With this arrangement, the groups of flues in one heating wall burn upward while corresponding groups in the next heating wall that are interconnected by the ducts 28 burn downward but the adjacent pairs of flues 14$^a$, 14$^b$ of the adjoining groups of four flues each which are served by different channels 32 and single riser conduits 18 are interconnected at their tops by the bus flues 27 to form the two limbs 14$^a$ and 14$^b$ of the double hairpin flues. The alternate regenerators 20$^a$ communicate by the regenerator ducts 25 with alternate groups of four flues 14$^a$ that are served by the same channel 32 in intermediate heating walls 11$^b$ and with intermediate groups of four flues 14$^b$ that are served by the same channel 32 in the alternate heating walls 11$^a$. The intermediate regenerators 20$^b$ likewise communicate by the ducts 25 and ports 26 with the intermediate groups of four flues 14$^b$ that are served by the same channel 32 in the intermediate heating walls 11$^b$ and with the alternate groups of four flues 14$a$ that are served by the same channel 32 in the alternate heating walls 11$a$. The off alternate branch conduits 15$^a$ communicate through their metal riser pipes 17 with the riser conduits 18 for the channels 32 for said alternate groups 14$^a$ in alternate heating walls 11$^a$ and for said intermediate groups 14$^b$ in the intermediate walls 11$^b$. The on intermediate branch conduits 15$^b$ likewise communicate through their metal riser pipes 17 with the riser conduits 18 for the channels 32 for said alternate groups 14$^a$ in the intermediate heating walls 11$^b$ and for said intermediate groups 14$^b$ in the alternate heating walls 11$^a$.

Figure 6:
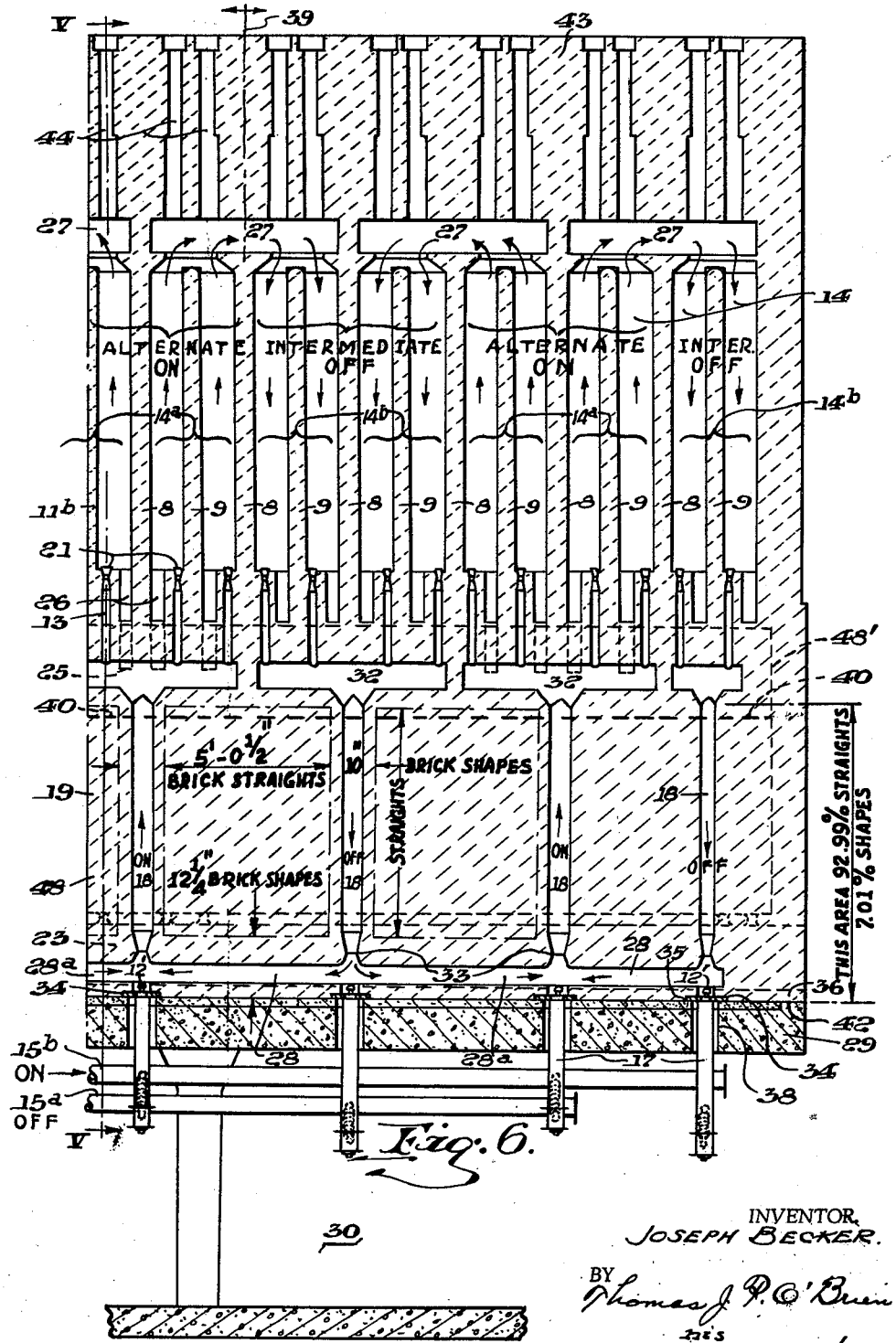
FIG. 6 is a vertical sectional view taken crosswise of the battery through one of the heating walls, the section being on the line VI—VI of FIG. 5.

In the embodiment illustrated in FIGS. 5, 6, and 6$a$, the invention is shown as applied to ovens in which the heating walls are also each constituted of heating flues 14 of the double hairpin flue type, with the vertical flues 14 also arranged in groups of four flues each and end groups of two flues each of which the flow is always in the same direction in all the flues of the group, and in which the flues of one adjoining pair 14$^a$ of two adjacent groups of flues burn upward while the other adjoining bar 14$^b$ of the adjacent groups burn downward. Waste gas recirculation is attained by means of recirculation ducts 28 located in the base of the silica brickwork of the regenerator walls 19 rather than in the concrete mat 29, as in FIGS. 1 to 4. The recirculation duct is a continuous one 28$^a$ interconnecting all of the riser conduits 18 for all of the groups in a single heating wall. In this case also, each riser conduit 18 individually serves a group of four flues through an individual distributing channel 32 and the individual riser ducts 13 to the respective vertical flues 14 of a group. With this arrangement, in the intermediate heating walls 11$^b$, the alternate groups of four flues 14$^a$ served by a common conduit 18, burn upward and the intermediate groups of four flues 14$^b$ served by a riser conduit 18 each burn downward, while the corresponding groups in the next adjacent alternate heating wall 11$^a$ burn downward in the alternate groups 14$^a$ and upward in the intermediate groups 14$^b$, but the adjacent pairs of flues 14$^a$, 14$^b$ of the adjoining groups of four flues each in each wall that are served by different channels 32 and riser conduit 18 are interconnected at their tops by the bus flues 27 to form the limbs 14$^a$ and 14$^b$ of the double hairpin flues. From FIG. 6, it will be seen from the dotted lines 48' that there is a much lesser ratio of special shapes (7%) to straight shapes (93%) in each pillar wall 19.

The alternate regenerators 20$^a$ communicate by the regenerator ducts 25 with alternate groups of four flues 14$^a$ that are served by the same channel 32 in intermediate heating walls 11$^b$ and with the intermediate groups of four flues 14$^b$ that are served by the same channel 32 in the alternate heating walls 11$^a$. The intermediate regenerators 20$^b$ likewise communicate by the ducts 25 and ports 26 with the intermediate groups of four flues 14$^b$ each that are served by the same channel 32 in the intermediate heating walls 11$^b$ and with the alternate groups of four flues 14$^a$ each that are served by the same channel 32 in the alternate heating walls 11$^a$. The off alternate branch conduits 15$a$ communicate through their metal riser pipes 17 with the riser conduits 18 for the channels 32 for said alternate groups 14$^a$ in the alternate heating walls 11$^a$ and for said intermediate groups 14$^b$ in the intermediate heating walls 11$^b$. The on intermediate branch conduits 15$^b$ likewise communicate through their metal riser pipes 17 with the riser channels 18 for the channels 32 for said alternate groups 14$^a$ in the intermediate heating walls 11$^b$ and for said intermediate groups 14$^b$ in the alternate heating walls 11$^a$.

In the embodiment illustrated in FIGS. 7 and 8, the invention is shown as applied to ovens in which the heating walls are also each constituted of heating flues 14 of the double hairpin flue type and with the vertical flues also arranged for operation in groups of four flues, except the end flues which are in groups of two flues, in each of which the flow is always in the same direction in all the flues of the same group, and in which one adjoining pair 14$^a$ of two adjacent groups burns upward while the other adjoining pair 14$^b$ of the adjacent groups burns downward. Waste gas recirculation is attained by means of recirculation ducts 28 located in the base of the silica brickwork of the regenerator walls, as in the embodiment illustrated in FIGS. 5 and 6, rather than in the concrete mat 29 as in FIGS. 1 to 4.

In this embodiment of FIGS. 7 and 8, however, the recirculation ducts 28$^b$ are not continuous ones, like the ducts 28$^a$ of FIGS. 5 and 6, but rather each duct 28$^b$ is one of a series of individual ducts 28$^b$ each one of which is individual to a pair of rich gas riser conduits 18, one of which riser conduits 18 is individual to only one adjoining pair of flues 14$^a$ of an adjacent group 14$^a$ of two adjacent groups 14$^a$, 14$^b$ of four flues each and the other of which riser conduits 18 is individual to only the other adjoining pair of flues 14$^b$ of the two adjacent groups 14$^a$ and 14$^b$ of four flues each in the same heating wall. In this case each recirculation duct 28$^b$ and its riser channels 18 communicate with the pairs of flues by a distribution channel 32$^a$ that is individual to solely a pair of flues, rather than four flues as in the embodiments of FIGS. 1 to 6, through the individual riser ducts 13. With this arrangement in each heating wall 11$^a$ or 11$^b$, the alternate groups of four flues 14$^a$ each served by two adjacent riser conduits 18 burn upward in alternation with the downflow of waste gas through the intermediate groups of four flues 14$^b$ each that are served by the next adjoining pairs of adjacent rich gas riser conduits 18, as in the case of the embodiments illustrated in FIGS. 1 to 6 and the corresponding groups of four flues 14$^a$ and 14$^b$ in a next adjacent heating wall burn in the opposite direction, that is, all alternate groups 14$^a$ of four flues in alternate heating wall 11$^a$ burn downward while the intermediate groups 14$^b$ burn upward, whereas in the next intermediate heating wall 11$^b$ all the alternate groups 14$^a$ of four flues burn upward while the intermediate groups 14$^b$ burn downward in alternation with each other in correspondence with the usual reversal in phase of regenerator operation. Yet, as in the case of FIGS. 3 to 6, the adjacent pairs of flues 14$^a$, 14$^b$ of each two adjoining groups 14$^a$, 14$^b$ of four flues each in each wall, whose channels 32$^a$ and riser conduits 18 are fed by the different rich fuel gas lines 15$^b$ and 15$^a$, are interconnected at their tops by the bus flues 27 to form the limbs 14$^a$ and 14$^b$ of the double hairpin flues.

Each of the alternate regenerators 20$^a$ communicate by the regenerator ducts 25 with the alternate groups of four flues 14$^a$ in that are served by two channels 32$^a$ in the intermediate heating walls 11$^b$, and with the intermediate groups of four flues 14$^b$ that are served by two channels 32$^a$ in the alternate walls 11$^a$ that are on opposite sides of an intervening coking chamber 10. Each of the intermediate regenerators 20$^b$ likewise communicate by the ducts 25 and ports 26 with the intermediate groups of four flues 14$^b$ that are served by two channels 32$^a$ in the intermediate heating walls 11$^b$, and with the alternate groups of four flues 14$^a$ that are served by two channels 32$^a$ in the alternate walls 11$^a$ that are on opposite sides of the intervening coking chambers. The off alternate branch conduits 15$^a$ communicate through their metal riser pipes 17 with the riser conduits 18 for the channels 32$^a$ for said intermediate groups of four flues 14$^b$ each in each intermediate heating wall 11$^b$, and with the riser conduits 18 for the channels 32$^a$ for said alternate groups of four flues 14$^a$ each in each alternate heating wall 11$^a$. The on intermediate branch conduits 15$^b$ likewise communicate through their metal riser pipes 17 with the riser conduits 32$^a$ for said alternate groups of four flues 14$^a$ each in each intermediate heating walls 11$^b$ and with the riser conduits 18 for the channels 32$^a$ for said intermediate groups of four flues 14$^b$ each in each alternate heating wall 11$^a$.

All these arrangements of FIGS. 3 to 8 are shown in oven batteries having horizontal coking chambers with all wide regenerators arranged for rich gas underfiring with gas that is not to be preheated in the regenerators, only the air for supporting combustion being preheated in the regenerators during their "on" period of operation in the regenerative cycle. By proper known subdivision of the regenerators into compartments, it is also possible to employ these designs of ovens in "combination" ovens designed for optional underfiring with either or both rich gas and lean gas, whereby the regenerators in part operate for inflow preheating of air and lean gas separately and simultaneously during their "on" phase of operation while still operating for off-flow of waste gaseous products of combustion during their "off" phase of operation in the reversible regenerative cycle.

The invention is hereinabove set forth as embodied in particular forms and manners but may be variously embodied within the scope of the invention in the claims hereinafter made.

I claim:

1. A regeneratively heated underjet coke oven battery comprising:
   (a) an upper silica masonry mass mounted on a lower concrete pad supported by subjacent means and forming an accessible basement undereneath said pad for access in regulation of said battery;
   (b) a series of alternate and intermediate horizontal coking chambers, and alternate and intermediate heating walls in the upper portion of the silica masonry mass, each of said heating walls being constituted of heating flues of the double hairpin flue type with the flues disposed in successive alternate and intermediate groups of four flues each, of which the flow is in the same direction in all flues of a group, and in which the flues of one adjoining pair of two adjacent groups are on while the flues of the other adjoining pair of adjacent groups are off, all of the on flues in a wall forming one set, the off flues forming a second set;

(c) a series of alternate and intermediate regenerators separated by pillar walls arranged in the lower portion of the silica masonry mass below the coking chambers and heating walls and above the aforesaid concrete pad, the alternate regenerators forming one set, the intermediate regenerators forming a second set, each set of regenerators being communicably connected at their tops with the flues of one of the two sets thereof;

(d) a set of horizontal distribution channels for each of the two sets of heating flues, each channel being connected solely to the flues of one of said groups of flues alongside the different regions of the coking chambers with each channel being located below the bottom of the flame flues in the brickwork at the tops of the regenerator walls;

(e) individual riser ducts extending from the horizontal channels upward to the base of each of the flame flues;

(f) two sets of riser brick conduits extending from the top of the concrete pad on which the regenerators rest upward to the horizontal channels through the regenerator walls, with each riser brick conduit of each set connected to and constituting sole means of supply for non-regeneratively preheated fuel gas to a separate one of the horizontal distribution channels;

(g) a single continuous recirculation duct located in the base of the silica brick regenerator pillar walls interconnecting all of the riser conduits for all the groups in a single heating wall;

(h) a metal riser pipe extending through a passageway in the concrete mat in axial alignment with each one of said riser brick conduits and interconnected with the silica brickwork for axially aligned movement in unison with their brick riser conduits as the brickwork expands;

(i) each of the metal riser pipes having an adjustable nozzle therein accessible from the basement space and at the region of juncture of the waste gas recirculation duct with the rich gas riser brick conduits, for discharge of rich gas in calibrated amounts in the form of a jet to induce a flow of waste gas through the recirculation ducts to the riser brick conduits; and (j) two sets of rich fuel gas branch conduits in the basement space with feed connections to the rich gas riser metal pipes of the two sets thereof respectively, with the adjacent pairs of adjoining groups of four flues each in each heating wall which are served by different horizontal distribution channels and riser conduits being interconnected at their tops by bus flues to form the two limbs of the double hairpin flues.

2. The invention as set forth in claim 1 wherein:
(a) the intermediate regenerators communicate by regenerator ducts with alternate groups of four flues that are served by the same horizontal distribution channel in alternate heating walls, and with intermedate groups of four flues that are served by the same horizontal distribution channel in intermediate walls;

(b) the alternate regenerators communicate by regenerator ducts with the remaining groups of four flues each that are served by the same horizontal distribution channel in the heating walls;

(c) alternate rich gas branch conduits in said basement space communicate with their metal riser pipes with the riser conduits for the horizontal distribution channels for said alternate groups in alternate heating walls and for said intermediate groups in said intermediate heating walls, while the intermediate rich gas branch conduits in said basement space likewise communicate through their metal riser pipes with the riser conduits for the horizontal distribution channels for said alternate groups in the intermediate heating walls and for said intermediate groups in the alternate heating walls.

3. The invention set forth in claim 1 wherein:
(a) the heating walls of said coke oven battery are each constituted of heating flues of the double hairpin flue type with the flues in successive groups of four flues each, the flow in all flues of a group being in the same direction;

(b) the flues of one adjoining pair of the two adjacent groups are on while the flues of the other adjoining pair of adjacent groups are off;

(c) the waste gas recirculation ducts are located in the base of the silica brickwork of the regenerator pillar walls in the form of a series of individual ducts each one of which is connected to a pair of rich gas riser conduits, one conduit of the pair being connected solely to one adjoining pair of flues of two adjacent groups of four flues each, and the other conduit of the pair being connected solely to an adjoining pair of flues of an adjacent group of four flues each in the same heating wall;

(d) each said riser conduit of the pair communicating with its pair of flues by means of a horizontal distributing channel connected to the pair of flues;

(e) alternate groups of four flues each are served by two adjacent riser conduits wherein a fuel mixture burns upward in alternation with the downward offflow of waste gases of combustion in the intermediate groups of four flues each that are served by the next adjoining rich gas riser conduits in both of two adjacent alternate and intermediate heating walls; and (f) the adjacent pairs of flues of adjoining groups of four flues each in each heating wall which are served by different horizontal distribution channels and riser conduits are interconnected at their tops to form the two limbs of the double hairpin flues.

References Cited by the Examiner

UNITED STATES PATENTS

| | | | |
|---|---|---|---|
| 2,306,366 | 12/42 | Becker | 202—151 |
| 2,507,554 | 5/50 | Van Ackeren | 202—151 |
| 2,516,929 | 8/50 | Van Ackeren | 202—151 |
| 3,047,474 | 7/62 | Tucker | 202—143 |

FOREIGN PATENTS 627,700   6/27   France.

MORRIS O. WOLK, *Primary Examiner.*

ALPHONSO D. SULLIVAN, *Examiner.*